United States Patent Office 3,756,991
Patented Sept. 4, 1973

3,756,991
COPOLYMERS OF VINYL CHLORIDE WITH
N-SUBSTITUTED MALEIMIDES
Gerhard Kühne, Burghausen (Salzach), and Alfons Neumaier, Burgkirchen (Alz), Germany, assignors to Farbwerke Hoechst Aktiengesellschaft vormals Meister Lucius & Bruning, Frankfurt am Main, Germany
No Drawing. Continuation of application Ser. No. 574,551, Aug. 24, 1966, which is a continuation of application Ser. No. 860,162, Sept. 17, 1969, both now abandoned. This application Jan. 27, 1971, Ser. No. 110,269
Claims priority, application Germany, Aug. 26, 1965, F 46,995
Int. Cl. C08g 20/20
U.S. Cl. 260—78 UA    1 Claim

ABSTRACT OF THE DISCLOSURE

A process for producing copolymers of vinyl chloride and maleic acid imides substituted at the nitrogen atom, said copolymers being obtained by contacting the vinyl chloride with about 1–15% by monomer weight of a maleic acid imide, to obtain a copolymer having improved dimensional stability under heat.

---

The present invention relates to a process for the manufacture of copolymers of vinyl chloride.

This application is a continuation of the application Ser. No. 574,551 filed Aug. 24, 196 and now abandoned which is a continuation of Ser. No. 860,162 filed Sept. 17, 1969, now abandoned.

Polyvinyl chloride softens at a temperature below the boiling point of water. The so-called second order transition temperature, that is the softening point, can be determined by various methods. Owing to the macromolecular structure of polyvinyl chloride and the different methods of processing, the determined value varies with the method of measuring used in a given case. A method commonly used for determining the softening point is the oscillating twisting method according to Schmieder and Wolff (cf. Kolloid-Zeitschrift, vol. 127 (1952), pages 65 to 78). According to this method, polyvinyl chloride has a softening point of 85° C., determined on calendered sheets.

Another generally acceptable method is performed according to Vicat on molded or compressed pieces.

The usability of shaped articles made of polyvinyl chloride is considerably increased if the softening point is above 100° C. while the other known properties of polyvinyl chloride are maintained, particularly the strength values, impact strength, good stabilisability, processability at elevated temperatures, color and odor. Processes for reaching this aim have already been known.

It has been proposed, for example, to afterchlorinate polyvinyl chloride in order to raise the softening point by an increased chlorine content, or to start from polyolefins and chlorinate them to chlorine content of more than 55%. However, such products are generally difficult to stabilize against heat and further additions are required to ensure satisfactory gelation.

According to another proposal vinyl chloride is polymerized at a temperature below 0° C. to obtain a polymer of chiefly syndiotactic chain structure and thus to increase the tendency to crystallite formation and consequently to raise the softening point. Such products have, however, the disadvantage that their processability is impaired and the brittleness is increased.

It is furthermore known that internal imides of α,β-ethylene-dicarboxylic acids and their derivatives substituted at the nitrogen atom can be easily copolymerized with vinyl chloride. However, there have only been obtained products that are soluble in chlorinated hydrocarbons and have a high content of the copolymerization component and the same softening point as normal polyvinyl chloride.

Recently it has been proposed to copolymerize vinyl chloride with N-phenyl-maleic acid imide and its phenyl substitution products whereby, however, increased values of dimensional stability under heat according to Vicat are only obtained if the product is compressed directly from the powder and more than 10% of N-phenyl-maleic acid imide are used. With conventional methods of processing, for example when the product is treated on mixing rolls at a temperature of 150 to 170° C. and subsequently shaped, the dimensional stability under heat is not increased. Only when a content of 30% of N-phenyl-maleic acid imide is used, the material is difficultly gelatinizable.

In another known process copolymers of maleic acid imide and styrene having a good thermostability under load are obtained by polymerization in an organic solvent, advantageously an aliphatic alcohol. When this process is applied to mixtures of maleic acid imide and vinyl chloride, products are obtained under the same polymerization conditions that have K values which are by 10 units lower than those obtained by polymerization in water. Moreover, the softening points is hardly influenced (86° C. as compared with 85° C. for pure polyvinyl chloride, determined by the oscillating twisting method).

Now we have found that products of considerably improved dimensional stability under heat as compared with polyvinyl chloride can be obtained by conventional methods of processing such as calendering or extrusion, by copolymerizing vinyl chloride with specific maleic acid imides substituted at the nitrogen atom. The present invention provides a process for the manufacture of copolymers of vinyl chloride with maleic acid imides substituted at the nitrogen atom by mass polymerization, emulsion polymerization or suspension polymerization in the presence of free radical forming catalysts, which comprises using as maleic acid imide a compound of the following formula

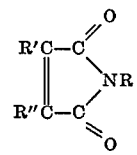

in which R stands for a greatly branched aliphatic, cycloaliphatic or aromatic group, and R' and R" stand for hydrogen, chlorine, bromine, fluorine, the cyano group or an alkyl group with at most 3 carbon atoms. In this formula R' and R" may be identical or different.

The products obtained by the process of the invention have considerably higher softening points than commercial polyvinyl chlorides.

As greatly branched groups R in the above formula there may be used, for example, hydrocarbon radicals with at least one tertiary or quaternary carbon atom, for example, —CH(CH₃)₂; —CH₂—CH(CH₃)₂; C(CH₃)₃;
—C(CH₃)₂—CH₂—C(CH₃)₂—CH₃;
—CH₂—CH(C₂H₅)—CH₂—CH₂—CH₂—CH₃;

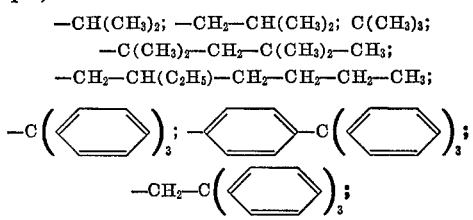

as well as alkyl-substitution products of these aliphatic and aromatic groups, and radicals which, in addition to at least one tertiary or quaternary carbon atom, contain also other atom groupings, for example, phthalic acid imide derivatives and sulfonic acid derivatives such as the radicals

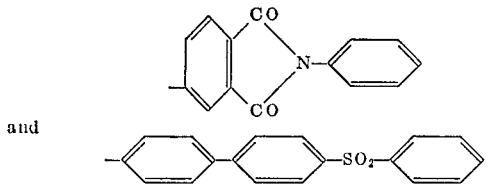

and

Further radicals suitable for use are cycloalkyl and cycloalkenyl groups or their alkyl-substituted products, i.e. radicals which are not only strongly branched but are also compact, for example, the bicyclo-[2,2,1]-heptyl-(2)-methyl radical and the 9,10-ethanol-9,10-dihydroanthracene radical. The cyclohexyl group is particularly effective, this being surprising. As will be shown, below, all these groups considerably contribute to improve the dimensional stability under heat, probably owing to steric hindrance. In many cases N-(tert.-butyl)-maleic acid imide and 4-maleinimido-tetraphenylmethane are particularly advantageous.

The content in the monomer mixture of maleic acid imide containing a strongly branched and/or compact radical R may be kept relatively low and is within the range of 1 to 15%, advantageously 2 to 7%, calculated on the total weight of the monomer mixture.

Whereas, for example, a sheet containing 6% of N-(tert.butyl)-maleic acid imide has a softening point of 94.5° C., a sheet containing 6% of N-(n-butyl)-maleic acid imide has a softening point of only 86° C. In both cases, polymerization had been performed at +50° C. under identical conditions. The sheets had been obtained likewise under identical conditions by kneading for 10 minutes at 170° C. on a two-roll mixer while adding 1.5% of the commercial organotin stabilizer di-octyl-Sn-thioglycolic acid octyl ester.

It is surprising that the tendency to gelatinize the product containing 6% of N-(tert.-butyl)-maleic acid imide, i.e. the product having the higher softening point, is not reduced as compared with the product containing 6% of N-(n-butyl)-maleic acid imide or a normal suspension polyvinyl chloride having the same molecular weight (K value) as the two copolymers.

The polymerization temperature is generally within the range of −40° to +65° C. If the copolymerization is carried out at temperatures above +40° C. and the monomer mixture contains more than 7% by weight of maleic acid imide of the above formula, products are obtained which have a weak natural color after processing. The polymerization is therefore advantageously carried out at a temperature below +40° C. or even below 0° C., preferably at a temperature within the range of −10° to −40° C., to favor a syndiotactic arrangement of the molecule chains and render it possible to use less than 7% of maleic acid imides. By proceeding in this manner copolymers are obtained which have extremely high softening points of above 100° C., can be well processed and and do not undergo discoloration. The products obtained by the process of the invention are also by far superior to the known homopolymers of vinyl chloride obtained at low temperatures since they are also distinguished by a good impact strength.

The polymerization may be carried out in mass, suspension or emulsion, including the technique of performing the reaction heterogeneously, that is polymerizing at two or more different temperatures or post-introducing one of the reactants in portions or continuously in the course of the polymerization.

The polymerization is carried out in the presence of known free radical forming catalysts, for example, peroxides and/or azo compounds. Peroxides or hydroperoxides which are formed in the reaction medium may also advantageously be used for activating the polymerization. For example, the system boralkyl/hydrogen peroxide makes a suitable activator. Of this system the hydrogen peroxide may be post-introduced in portions in the course of the polymerization to keep the reaction constant.

As auxiliary agents for the emulsion and suspension polymerization, conventional emulsifiers and dispersing agents may be used. Examples of suitable emulsifiers are alkyl sulfonates, alkyl sulfates, alkyl aryl sulfonates, and sulfosuccinic acid ester. Methylated cellulose, polyvinyl alcohol and partially hydrolyzed polyvinyl acetate may be used as dispersing agents.

As polymerization vessels there may be used autoclaves of stainless steel provided with a stirrer or enamelled stirred vessels, mounted with jacket cooling and heating.

The products are worked up in usual manner. A latex obtained by emulsion polymerization is worked up by spray or drum drying. A dispersion obtained by suspension polymerization is dried in a pneumatic conveying dryer or in a rotary tube. A powder obtained by mass polymerization is merely screened after removal of unreacted monomer.

The copolymers may be shaped on extruders or calenders. For stabilizing, conventional stabilizers for polyvinyl chloride or their mixtures with epoxides, phosphites, brighteners and dyestuffs are used to obtain an optimum effect.

The following examples serve to illustrate the invention, but are not intended to limit it.

EXAMPLE 1

A liquor of 14 liters of water free from salt and containing 0.2% calculated on the total weight of the monomers, that is 12 g. of methyl cellulose (25 centipoises), was placed in a 25-liter vessel provided with a stirrer and jacket cooling. The vessel was evacuated and purged with nitrogen, and a solution of 10% (600 g.) of N-(tert. butyl)-maleic acid imide and 0.3% (18 g.) of lauroyl peroxide in 5.4 kg. of vinyl chloride was introduced under pressure while stirring and polymerized at 50° C. under stirring. After 12 hours the reaction was terminated. By drying the suspension a medium-fine grit having a K value of 64 was obtained in a yield of 85%.

The product was stabilized with 1.5% of the organotin stabilizer dioctyl tin thioglycolic acid octyl ester in glycerol oleate and then treated at 170° C. on mixing rolls. The tendency to gelatinize was equal to that of a commercial normal suspension polyvinyl chloride. The heat stability under these conditions was 50 minutes.

A second mixture was rolled for 10 minutes to obtain a sheet 0.3 mm. thick. It had a softening point of 101° C. as determined by the oscillating twisting method. The softening points indicated hereinafter were determined by the same method.

EXAMPLE 2

The process was carried out as described in Example 1 while polymerizing, instead of 10% of N-(tert.butyl)-maleic acid imide, 7% by weight (420 g.) of 4-maleinimido-tetraphenylmethane in the presence of 0.3% (18 g.) of lauroyl peroxide in 5.58 kg. of vinyl chloride. The reaction time was 15.5 hours at 50° C. After working up, the yield was 83%. The product had a medium grain size of 150μ. It could be well processed at 170° C. under the usual conditions to obtain a sheet 0.3 mm. thick, having a softening point of 97° C.

EXAMPLE 3

The process was carried out as described in Example 1 while polymerizing, instead of 10% of N-(tert.butyl)-maleic acid imide, 5% (300 g.) of 4-maleinimido-3,5-dimethyl-tetraphenylmethane in the presence of 0.3% (18 g.) of lauroyl peroxide in 5.7 kg. of vinyl chloride. The reaction time was 18 hours at 50° C. The yield was 85%. Under the usual conditions the medium-fine powder was

EXAMPLE 4

The process was carried out as described in Example 3 while using 5% (300 g.) of N-(1,1,3,3-tetramethyl-butyl)-maleic acid imide. After 17 hours a medium-fine product was obtained. It was made at 170° C. into a sheet having a softening point of 95° C.

EXAMPLE 5

The process was carried out as described in Example 1 while using 5% (300 g.) of N-(tert.butyl)-maleic acid imide in 5.7 kg. of vinyl chloride. The reaction time was 13.5 hours. The K value was 67. A sheet obtained at 170° C. had a softening point of 94.5° C.

EXAMPLE 6

The process was carried out as described in Example 1 while using 10% of N-phenyl-4-maleinimido-phthalimide. The reaction time was 16 hours. A product of medium grain size was obtained in a yield of 83%. A rolled sheet obtained as described in Example 1 had a softening point of 98° C.

EXAMPLE 7

A liquor of 14 liters of water freed from salt and containing 0.5% (30 g.) of partially hydrolyzed polyvinyl acetate was placed in a 25-liter vessel provided with a stirrer. A solution of 5% (300 g.) of N-(tert.butyl)-maleic acid imide and 0.3% (18 g.) of lauroyl peroxide in 2 kg. of vinyl chloride was introduced under pressure while stirring and polymerized at 50° C. while stirring.

After 3 hours 2 kg. of vinyl chloride were introduced under pressure, and after a further 3 hours 1.7 kg. of vinyl chloride.

The reaction was terminated after 15 hours. By separating the water and drying, 4.9 kg. of a medium-fine product having a medium grain size of 150$\mu$ were obtained.

A sheet made at 170° C. had a softening point of 96° C.

EXAMPLE 8

The process was carried out as described in Example 5 while increasing the polymerization temperature to 55° C. after 10 hours. The reaction was terminated after 15.5 hours. After isolating the product and determining a yield of 85%, the processability of the product on a roll was tested. The tendency of the product to gelatinize (K value 64) was by 10 seconds more favorable than that of the product of Example 5. A softening point of 94° C. was determined in the manner described above.

EXAMPLE 9

A 25-liter autoclave provided with stirrer which had been purged with nitrogen and was kept at −15° C. with a brine solution, was charged with 5% (1.0 kg.) of N-(tert.butyl)-maleic acid imide, and 19.0 kg. of vinyl chloride were introduced. From a separate vessel, 0.3% (60 g.) of tri-(n-butyl)-boron in 100 cc. of hexane and from still another vessel 18 g. of $H_2O_2$ of 33% strength (0.03% of $H_2O_2$ of 100% strength) were introduced under pressure. The whole was stirred at 50 r.p.m. with a blade stirrer which extended over the whole shaft and left only a small clearance of 5 mm. between the end of the blade and the wall of the reaction vessel. After 5 hours 18 g. of $H_2O_2$ of 33% strength were introduced under pressure. This was repeated after 10, 15 and 20 hours, respectively. After 23 hours the internal temperature was raised to 22° C. and the vinyl chloride in excess was removed. The vessel was opened and 15 kg. of a product which was as fine as dust were withdrawn and passes through a 300$\mu$ sieve. The K value was 85. A test sample of 300 g. was stabilized as described in Example 1 and treated at 180° C. on mixing rolls. The gel time was twice as high as in Example 1. A 0.3 mm. sheet drawn off from the rolls had a softening point of 105° C.

EXAMPLE 10

The process was carried out as described in Example 9 while polymerizing at −30° C. and charging the autoclave with 3% (0.6 kg.) of N-(tert.butyl)-maleic acid imide and 19.4 kg. of vinyl chloride. From a separate vessel 0.4% (80 g.) of tri-(n-butyl)-boron in 100 cc. of hexane were introduced under pressure while otherwise proceeding as described in Example 9. The reaction time was 28 hours. A product as fine as dust was obtained and passed through a sieve of 300$\mu$. The K value was 90.1. A test sample of 300 g. was rolled at 180° C. as described in Example 9. A 0.3 mm. sheet drawn off from the rolls had a softening point of 110° C.

EXAMPLE 11

An emulsifier solution containing 2.5% (87.5 g.) of an alkyl sulfonate with 12 carbon atoms and 2.25 g. of disodium phosphate in 4.5 liters of water freed from salt was placed in a 10-liter autoclave provided with stirrer. The pH value was adjusted to 9.5 with ammonia. After evacuation and purging with nitrogen a solution of 5% (175 g.) of N-(tert.butyl)-maleic acid imide in 3.33 kg. of vinyl chloride was added. From a separate vessel 0.2% (7.0 g.) of tri-(n-butyl)-boron in 10 cc. of ethanol and from still another vessel 0.15% (15.7 g.) of $H_2O_2$ of 33% strength were introduced under pressure. Polymerization was carried out at 30° C. while stirring. After 5, 10 and 20 hours, respectively, 0.15% (15.7 g.) of $H_2O_2$ were introduced under pressure.

After 32 hours the pressure had dropped to 2.0 atmospheres gage. A latex of a solid content of 39% was obtained, which corresponded to an extent of conversion of monomers of about 88%. The K value was 82.5.

The latex was dried on a drum dryer. After having been stabilized as described in Example 1, the product was rolled at 175° C. A sheet drawn off after 10 minutes had a softening point of 97° C.

EXAMPLE 12

A 5-liter glass flask provided with a stirrer and a reflux condenser with Dry-Ice cooling was purged with nitrogen until it was free from air and then charged with a mixture of 4 kg. of vinyl chloride and 20 g. (0.5%) of N-(cyclohexyl)-maleic acid imide. 0.02% (0.8 g.) of tri-(n-butyl)-boron and 0.6 cc. of $H_2O_2$ of 33% strength were subsequently added. Polymerization was carried out at −14° C. while stirring.

After a reaction time of 1.5 hours the polymer was separated from unreacted monomer. 240 g. (extent of conversion 6%) of a white voluminous product of a K value of 97 were obtained. The polymer contained 7% of N-(cyclohexyl)-maleic acid imide.

A sheet prepared at 180° C. had a softening point of 108° C.

EXAMPLE 13

The process was carried out as described in Example 12 while polymerizing instead of 0.5% of N-(cyclohexyl)-maleic acid imide, 2% (80 g.) of N-bicyclo-[2,2,1]-heptyl-(2)-methyl-maleic acid imide with 4 kg. of vinyl chloride. After a polymerization time of 1.7 hours, 430 g. of a product containing 14% of N-bicyclo-[2,2,1]-heptyl-(2)-methyl-maleic acid imide were obtained. The product was processed at 180° C. as described above. A sheet having a softening point of 112° C. was obtained.

EXAMPLE 14

The process was carried out as described in Example 12 while using a monomer mixture of 4 kg. of vinyl chloride and 40 g. (1%) of 11-maleinimido-9,10-ethano-9,10-dihydroanthracene. 20 g. (0.5%) of cyclohexene were additionally added to the reaction mixture as a regulator. After polymerizing for 2 hours, the extent of conversion was 7.8% (310 g.). The product had a K value of 73 and contained 13% of N-alkyl-maleic acid imide. A sheet made at 180° C. from the copolymer had a softening point of 123° C.

We claim:

1. Copolymers of vinyl chloride with maleic acid imide substituted at the nitrogen atom having a minimum softening point of about 94° C., consisting essentially of the reaction product of vinyl chloride with about 1 to 15% maleic acid imide monomer calculated on the total weight of the monomers, the reaction being effected in the mass, by emulsion or suspension polymerization at about −40° C. to +65° C. in the presence of a free radical-forming catalyst, said maleic acid imide monomer having the formula

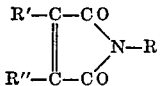

wherein R is a saturated aliphatic or cycloaliphatic hydrocarbon group containing at least one tertiary or quaternary carbon atom; R' and R" are individually defined as a hydrogen, chloro, bromo, fluoro, or alkyl group having 1 to 3 carbon atoms.

References Cited
UNITED STATES PATENTS

| | | | |
|---|---|---|---|
| 2,342,295 | 2/1944 | Orthner et al. | 260—78 UA |
| 2,384,239 | 9/1945 | Dorough | 260—78 UA |
| 2,686,773 | 8/1954 | D'Alelio | 260—78 UA |
| 2,825,716 | 3/1958 | D'Alelio | 260—78 UA |
| 2,686,774 | 8/1954 | D'Alelio | 260—78 UA |
| 3,299,010 | 1/1967 | Samour | 260—78 UA |

HAROLD D. ANDERSON, Primary Examiner

U.S. Cl. X.R.

260—17 A, 29.6 HN, 45.75 K, 78 S, 874